United States Patent
Pare, Jr. et al.

(10) Patent No.: US 8,228,806 B2
(45) Date of Patent: *Jul. 24, 2012

(54) METHOD AND SYSTEM TO DETECT PACKETS OF DIFFERENT FORMATS IN A RECEIVER

(75) Inventors: Thomas Edward Pare, Jr., Mountain View, CA (US); Kiran Uln, Pleasanton, CA (US); Peter Loc, Cupertino, CA (US)

(73) Assignee: Mediatek Inc., Hsin-Chu (TW)

( * ) Notice: Subject to any disclaimer, the term of this patent is extended or adjusted under 35 U.S.C. 154(b) by 131 days.

This patent is subject to a terminal disclaimer.

(21) Appl. No.: 12/563,979

(22) Filed: Sep. 21, 2009

(65) Prior Publication Data

US 2010/0315952 A1 Dec. 16, 2010

Related U.S. Application Data

(60) Provisional application No. 61/187,226, filed on Jun. 15, 2009.

(51) Int. Cl.
*H04L 12/26* (2006.01)
*H04W 84/02* (2009.01)

(52) U.S. Cl. ........................................ 370/241; 370/338

(58) Field of Classification Search .................. 370/241, 370/310, 328, 329, 338, 335
See application file for complete search history.

(56) References Cited

U.S. PATENT DOCUMENTS

| | | | |
|---|---|---|---|
| 2009/0031185 A1* | 1/2009 | Xhafa et al. ................... | 714/751 |
| 2009/0103485 A1* | 4/2009 | Singh et al. .................... | 370/329 |
| 2009/0154427 A1* | 6/2009 | Lee et al. ........................ | 370/335 |
| 2010/0027490 A1* | 2/2010 | Mazet et al. ................... | 370/329 |
| 2010/0046358 A1* | 2/2010 | van Nee ......................... | 370/210 |
| 2010/0046542 A1* | 2/2010 | van Zelst et al. .............. | 370/465 |
| 2010/0177656 A1* | 7/2010 | Kim et al. ....................... | 370/252 |
| 2010/0260159 A1* | 10/2010 | Zhang et al. ................... | 370/338 |
| 2010/0310002 A1* | 12/2010 | Lauer et al. .................... | 375/267 |
| 2011/0051705 A1* | 3/2011 | Jones et al. .................... | 370/338 |

OTHER PUBLICATIONS

WIKIMEDIA Foundation, Inc., IEEE 802.11, http://en.wikipedia.org/wiki/IEEE_802.11-2007, pp. 1-11.
IEEE Standards Association, IEEE Ratifies 802.11n, Wireless LAN Specification to Provide Significantly Improved Data Throughput and Range, http://standards.ieee.org/anouncements/ieee802.11n_2009amendment_ratified.html, pp. 1-3.

* cited by examiner

*Primary Examiner* — Chi Pham
*Assistant Examiner* — Robert Lopata
(74) *Attorney, Agent, or Firm* — Sawyer Law Group, P.C.

(57) ABSTRACT

A method and system of communicating packets and detecting packets are disclosed. In a first aspect, the method and system comprise enabling the detection of a very high throughput (VHT) signal field. The VHT signal field is distinguishable from other signal fields, wherein the VHT signal field allows for a backward compatibility with other devices. In a second aspect, the method and system comprise initializing the device to be in receive mode and receiving at least one signal field symbol and detecting the presence of additional signal field symbols. The method and system further include distinguishing a very high throughput (VHT) signal field from other signal field symbols and decoding the VHT signal field parameters uniquely describing the VHT packet format.

12 Claims, 5 Drawing Sheets

METHOD AND SYSTEM TO DETECT PACKETS OF DIFFERENT FORMATS IN A RECEIVER

CROSS-REFERENCE TO RELATED APPLICATIONS

Under 35 U.S.C. 119(e), this application claims priority to U.S. provisional patent application No. 61/187,226 filed Jun. 15, 2009.

FIELD OF THE INVENTION

The present invention relates generally to wireless data communication systems and more particularly to the detection of different types of packets.

BACKGROUND OF THE INVENTION

In a wireless communication system such as a WiFi system, information is transmitted and received in orthogonal frequency-division multiplexing (OFDM) packets. A receiver in such a system needs to detect a packet and its format first, and then the receiver configures its hardware and software to receive and decode the data portion of the packet.

Each OFDM packet includes a plurality of pre-amble fields to assist the receiver in detecting, synchronizing, and conditioning the packet. The pre-amble fields are followed by an encoded signal field that carries information about data rate, packet length, and etc. The signal field is decoded and then used to configure the receiver to receive and decode the data portion of the packet. In the high throughput (HT) WiFi standard IEEE draft document (802.11n), mixed mode and green field OFDM frame formats are allowed to co-exist with a low throughput legacy frame format. In this standard the mixed mode frame format allows a legacy device to handle a HT packet properly and the green field frame format allows for less overhead and therefore higher throughput in an HT only system.

Accordingly, what is desired is a system and method that allows a receiver to receive and decode data packets in an efficient fashion when the receiver can receive packets in different types of formats. The system and method should be easily implemented, cost effective and adaptable to existing communications systems. The present invention addresses such a need.

SUMMARY OF THE INVENTION

A method and system of communicating packets and detecting packets are disclosed. In a first aspect, the method and system comprise enabling the detection of a very high throughput (VHT) signal field. The VHT signal field is distinguishable from other signal fields, wherein the VHT signal field allows for a backward compatibility with other devices. In a second aspect, the method and system comprise initializing the device to be n receive mode and receiving at least one signal field symbol and detecting the presence of additional signal field symbols. The method and system further include distinguishing a very high throughput (VHT) signal field from other signal field symbols and decoding the VHT signal field parameters uniquely describing the VHT packet format.

Other aspects and advantages of the present invention will become apparent from the following detailed description, taken in conjunction with the accompanying drawings, illustrating by way of example the principles of the invention.

DETAILED DESCRIPTION OF PREFERRED EMBODIMENTS

Figure 1:
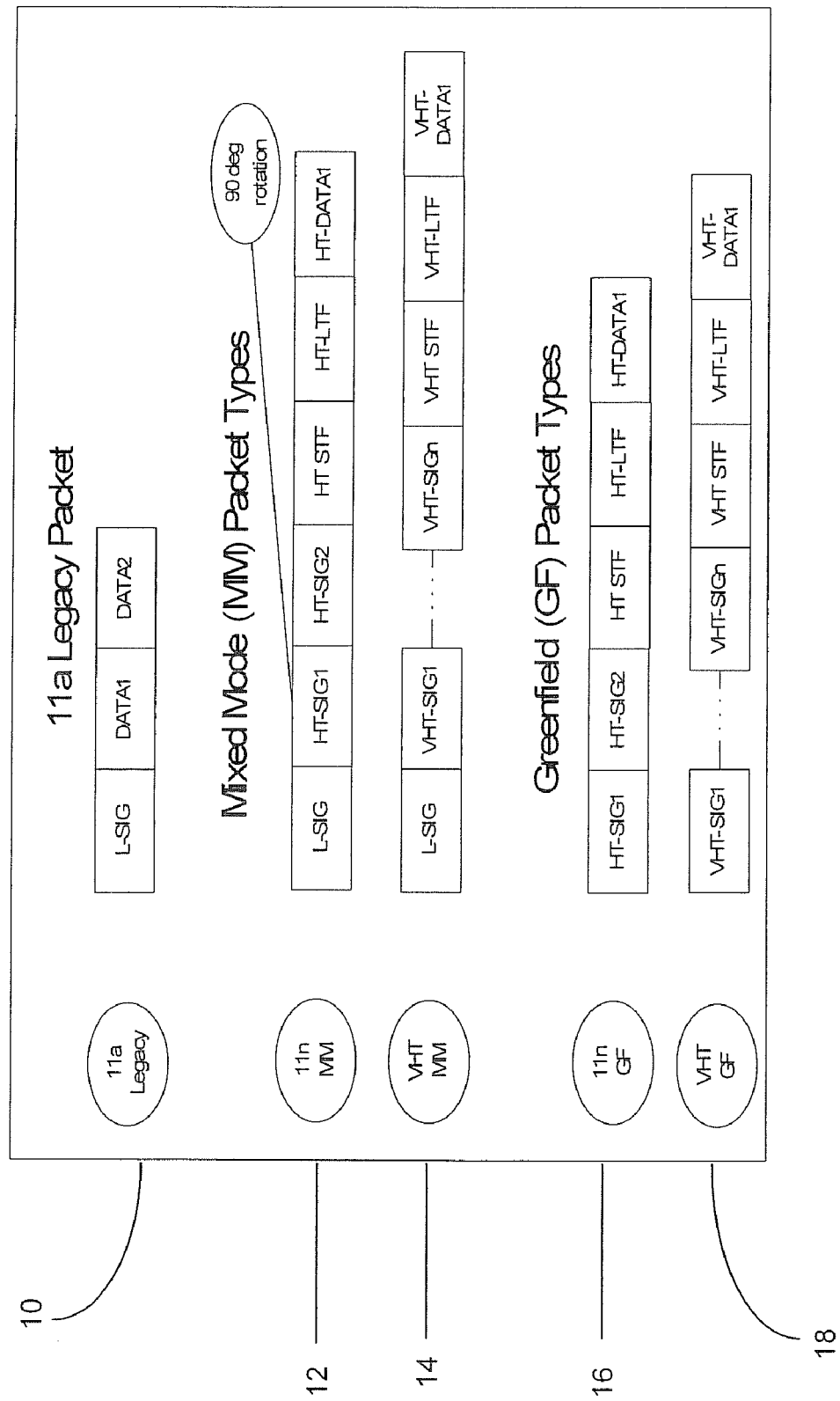
FIG. 1 is a block diagram which illustrates frames in the legacy format, the mixed mode format and the green field format in IEEE802.11n, along with the new VHT format.

The present invention relates generally to communication systems and more particularly to wireless communication systems. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

A system and method in accordance with the present invention allows for a receiver to effectively detect and decode the format of a plurality of packets transmitted in a wireless network. Specifically, the system allows for a receiver which can receive packets in different formats to detect whether the IEEE802.11n packets are in a very high throughput (VHT) format or a legacy OFDM format. In so doing, a receiver can operate efficiently when receiving and decoding packets.

Although an embodiment will be described based upon a WiFi system in which OFDM packets are utilized. One of ordinary skill in the art recognizes a system and method in accordance with an embodiment can be utilized in a variety of embodiments and that use would be within the spirit and scope of the present invention. For example, the receiver could receive, for example, Complimentary Code Keying (CCK) packets, Ethernet packets and the like and their use would be within the spirit and scope of the present invention. For example, the types of high throughput formats may differ from mixed mode format and the green format disclosed herein but those formats would still be applicable in a system and method in accordance with the present invention. Accordingly, although the system and method in accordance with the present invention will be discussed in the context of a particular embodiment, one of ordinary skill in the art recognizes that it can be utilized in a variety of environments and is not limited to the embodiments described herein.

In a system and method in accordance with an embodiment, the detection of high throughput frame formats in a WiFi system (e.g., structured 802.11n) is based on the detection of high throughout signal field (HT-SIG) field, which is modulated in a 90 degree rotated Binary Phase Shift Key (BPSK). A method and system in accordance within an embodiment detects the HT-SIG field by comparing the equalized symbols' of the power in I and Q parts the packets. In an embodiment, the detector distinguishes whether the packets received OFDM frames are in the mixed mode, green field, and legacy formats. The detector in accordance with an embodiment can distinguish frames among mixed mode, green field, and legacy formats without parallel decoding. A system and method in accordance with an embodiment provides a fast, reliable, efficient, and well-fitted implementation in a plurality of receiver designs.

A system that utilizes a detection procedure in accordance with the present invention can take the form of an entirely hardware implementation, an entirely software implementation, or an implementation containing both hardware and software elements. In one implementation, this detection procedure is implemented in software, which includes, but is not limited to, application software, firmware, resident software, microcode, etc.

Furthermore, the detection procedure can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk-read/write (CD-R/W). To describe the features of the present invention in more detail, refer now to the following description in conjunction with the accompanying Figures.

FIG. 1 shows the structure of the 11a (legacy mode) packets 10, 11n high throughput (HT) packets 12, mixed mode very high throughput (VHT) packets 14, 11n green-field mode packets 16 and green-field mode VHT packets 18 and 20 in accordance with an embodiment. In the 11a legacy packet, the portion shown is the portion of the packet following the short and long training fields (STF, and LTF) fields, which are primarily for packet detection, AGC and channel training. The signal field, as defined in the specification IEEE802.11a-1999, contains the signal information pertaining to the data portion of the packet, including data modulation, number of symbols, coding rate, and parity bit protection. The receiver uses this information, contained in the L-SIG symbol shown in FIG. 1, to set-up the subsequent decoding processing the data symbols. The 11a standard defined packet data rates of up to 54 Mb/s.

Figure 2:
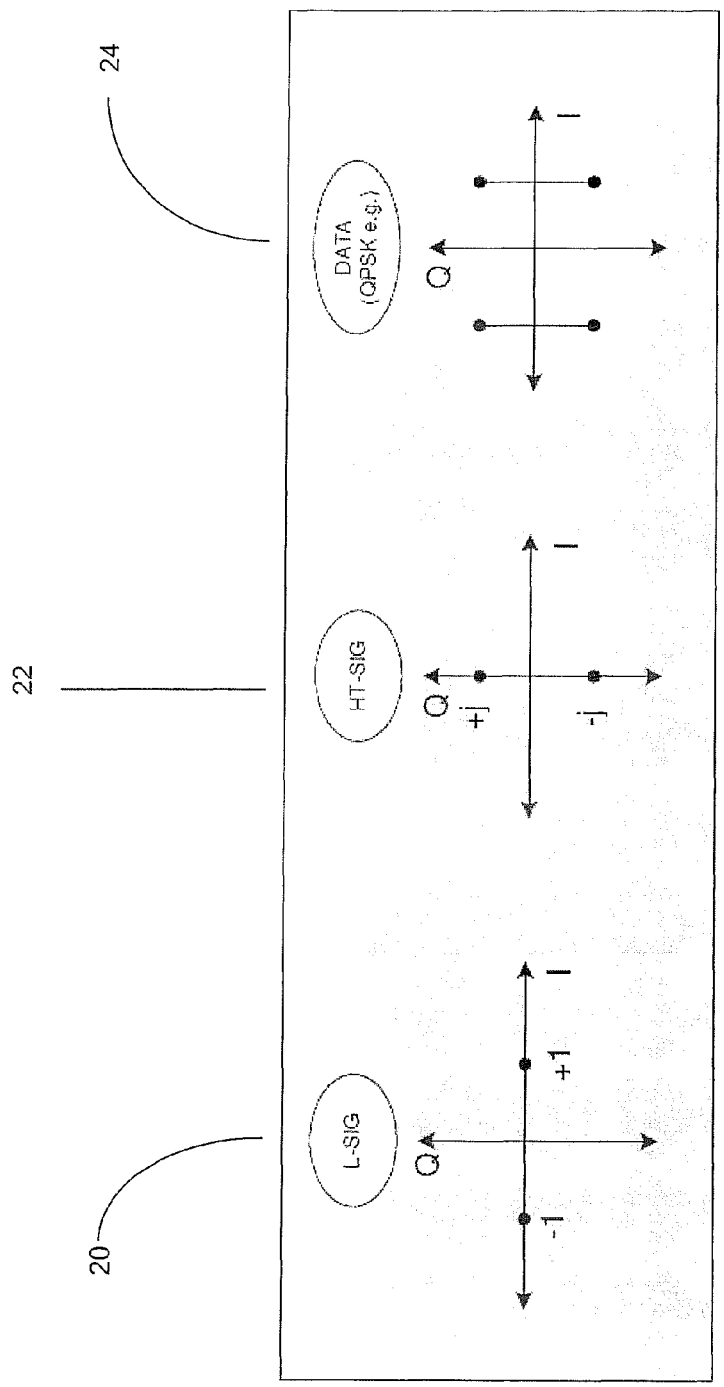
FIG. 2 illustrates the constellation diagrams for L-SIG, HT-SIG and DATA.

With the release of the draft IEEE802.11n-2009 standard, a new preamble was defined to signal packets of 600 Mb/s, requiring an extensive set of signal parameters that necessitated the expansion of the signal field into two symbols, shown as HT-SIG1 and HT-SIG2 in FIG. 1, immediately following the L-SIG field. To ensure co-existence with the 11a devices, the HT-SIG fields are modulated with a 90 degree rotation, so that instead of a traditional BPSK symbol with real components, the HT-SIG is signaled on the imaginary (Q) axis, as depicted in FIG. 2. FIG. 2 depicts the constellation diagrams for the L-SIG field 20, the HT-SIG field 22 and DATA field 24.

Accordingly, coexistence between the 11a and 11n devices can be ensured by prescribing the length of the packet in the L-SIG field so that legacy devices receiving an HT packet will know how long the packet will be, and to defer the medium to the particular transmitting device, even though the packet will not be decodable by the legacy decoder. Meanwhile, the 11n device will be trying to detect the presence of the HT-SIG field, by checking the symbol following the L-SIG field to see if it has the 90-degree rotation. It typically will do this by comparing the energy components along the real and imaginary axis of the frequency domain symbol.

The challenge for the proposed new VHT standard, offering even higher data rates, is to design a preamble field that will allow a VHT device to coexist with both 11a and 11n devices. This signal field will preferably be as efficient as the HT-SIG field, immediately following the L-SIG field as shown in FIG. 1, and allow the VHT preamble to be uniquely distinguishable from the previous two preambles.

Figure 3:
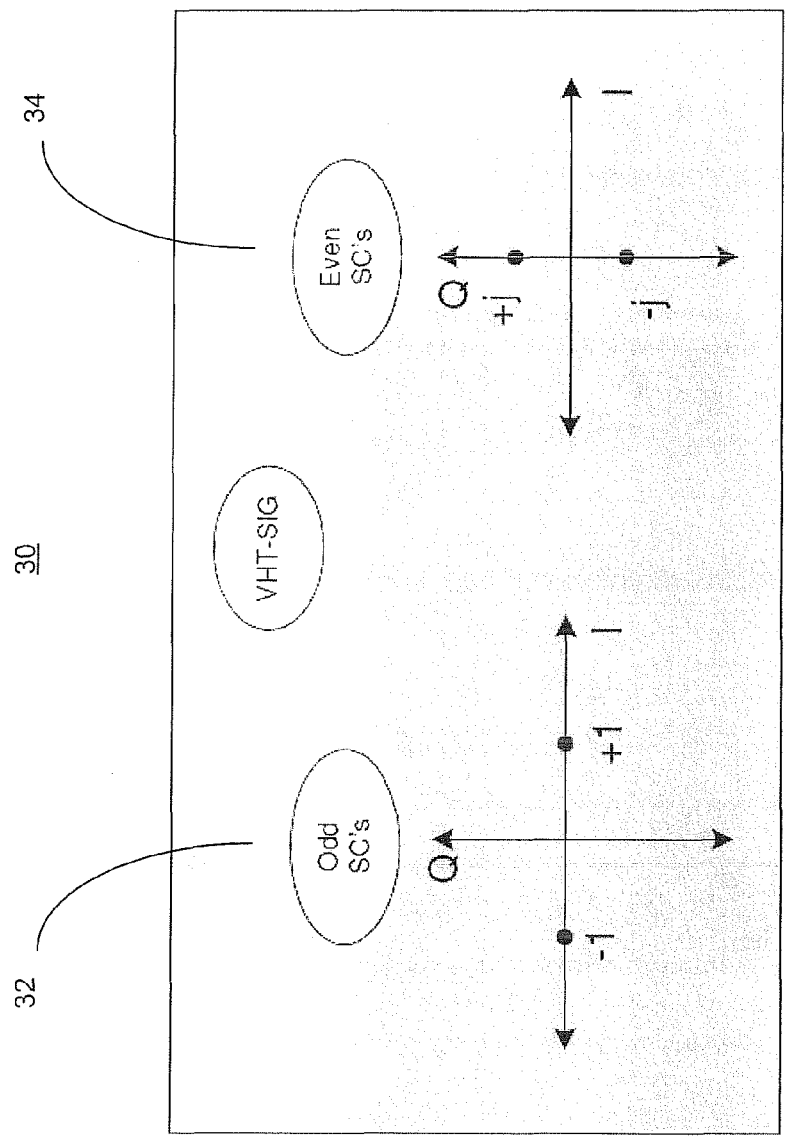
FIG. 3 illustrates the VHT-SIG constellation diagrams for the odd subcarriers and the even subcarriers.

The approach taken here is to generalize the 90-degree rotation so that the new VHT-SIG can be easily recognized. That is, it can be distinguished from both an HT-SIG field, and a legacy DATA field simultaneously. One embodiment of the design utilizes 90-degree BPSK symbols on alternating sub-carriers, odd and even, as shown in FIG. 3. FIG. 3 shows t the constellation diagrams of the odd subcarriers 32 and the even subcarriers 34. Using a new detection scheme, this preamble will accomplish the VHT coexistence requirement.

Figure 4:
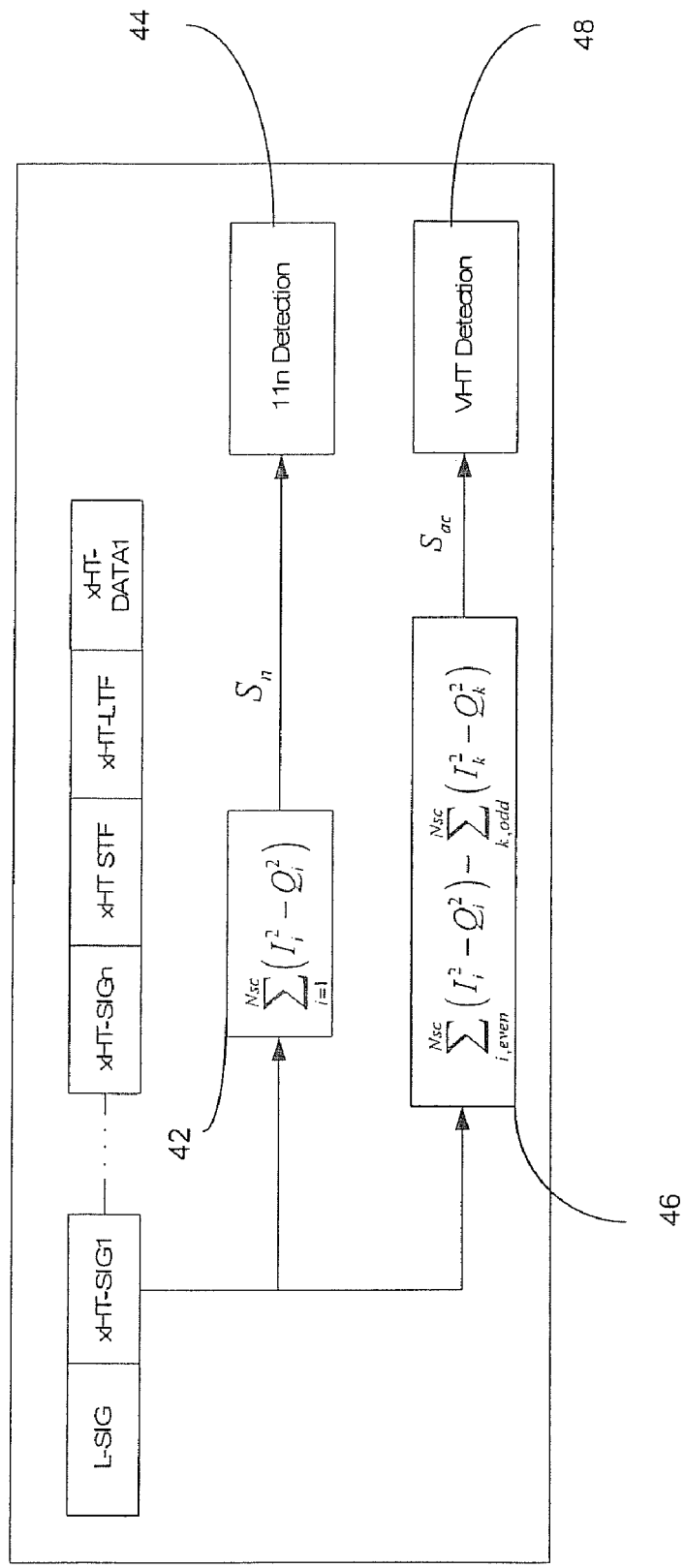
FIG. 4 illustrates a generally accepted approach to distinguishing the 11n HT-SIG field in parallel with a new detector for recognizing the new VHT packet format.

An approach to distinguishing the 11n HT-SIG field is shown in FIG. 4. Here the 11n HT-SIG field is distinguished by summing the difference in power between the real (I component) and imaginary (Q component) BPSK symbols, across all of the rotated subcarriers. This is shown as element 42 as is written as:

$$11n: \sum_{i=1}^{Nsc} (I_i^2 - Q_i^2)$$

In particular, if the packet is an 11n packet with the 90-degree shifted BPSK OFDM symbol, all the energy will line up on the imaginary axis, making the Q components large. The output will be a large negative number received by 11n detection mechanism 44. It will be distinguishable from an 11a packet, because the 11a packet will have a data symbol in that corresponding time slot. In general, the data symbol in QAM, and contains equal energy on both I and Q components, so that if the packet is 11a, the output of the 11n detector will read zero. Thus, by comparing the summed output to a preset negative threshold, the 11n and 11a can be uniquely identified.

Using the alternating 90-degree BPSK OFDM to signal the VHT-SIG field, the corresponding form of the detector 46 takes the modified form:

$$11ac: \sum_{i,even}^{Nsc} (I_i^2 - Q_i^2) - \sum_{k,odd}^{Nsc} (I_k^2 - Q_k^2),$$

where the summations are over even and odd subcarriers. The output will be a large negative value received by VHT detection mechanism 48 when the VHT-SIG field is present. Summarizing the detection outputs, where S is the largest possible value of the detectors, as shown in Table 1, we see the this the new VHT signal detection scheme is equally effective as that for the current 11n system, where both will output a value of −S with there respective signal field inputs, and 0 if they encounter a data symbol. Similarly, each will output a zero value when the respective input the other type of signal field.

| Metric | Data Symbol | 11a L-SIG | 11n HT-SIG | VHT-SIG |
|--------|-------------|-----------|------------|---------|
| 11n    | 0           | S         | −S         | 0       |
| VHT    | 0           | 0         | 0          | −S      |

This detection scheme will work for either for Mixed-mode or Greenfield (GF) formats shown in FIG. 1. For Mixed-mode packets, an 11n device will recognize the L-Sig field, and then check the next symbol for the presence of the HT-SIG field. If the packet is a legacy 11a or the new VHT format, the detector will readout 0, and the 11n device will defer the medium for the duration of the packet. For Greenfield operation, the HT-GF, shown in FIG. 1, eliminates the L-SIG portion of the preamble, for added efficiency, when there are no legacy devices on the network. However, an important coexistence feature is to require 11n devices the same detection capability of legacy devices during GF operation. (For example, this feature ensures that at a future time, a legacy device might be recognized on a GF network, and allow operation to fallback to Mixed-mode to accommodate the new legacy device.) Because the new VHT-SIG MM field allows VHT devices to operate in an HT-GF network, because it includes a L-SIG field recognizable by the 11n devices.

For additional efficiency, the VHT-GF format is defined in FIG. 1 is intended for use when there are only VHT devices on the network. Similar to the 11n GF compatibility requirement to recognize Legacy users, VHT-GF devices will can equally detect L-SIG, HT-MM, or HT-GF packets because using the detector structure depicted in FIG. 4. For example, in VHT-GF mode, when a legacy, or HT-MM packet is received, the detector will read +S, while the VHT detector reads 0. Similarly, for a HT-GF packet, the 11n detector will read −S while the VHT detector will read 0. In both cases, the VHT device will have adequate forewarning of the presence of these other formats and adjust the decoder accordingly.

The new signal and detection method is easily extended to accommodate other signal field types, or a set of fields, for future expansion, or for the purpose of designating data packets for particular user, or type of user.

For example, the alternating odd-even sequence shown in FIG. 3 can be reversed, signaling 0-degree BPSK on the even subcarriers, and the 90-degree on the odd. In fact, it can be replaced with any 0-1 sequence (0 denoting 0-degree shift and 1 denoting 90-degree shift). As long as the sequence is known to both the transmitter and the receiver, the VHT receiver will have to search for this pattern. In the case when the polarity is reversed, the VHT metric polarity will be reversed, to +S. In general, the receiver will have a weighted summation in the detection algorithm above and compare against a threshold. The performance is not affected since all these sequences are equi-distant from the pseudo-data symbol with two-dimensional constellations.

The discussion above elaborated on a BPSK sequence being used to signal a transition between 11 a/b/g/n/VHT packets. The concepts can be extended to any signaling constellation that can be distinguished in the two dimensions. For example, the BPSK (2 signaling points) can be replaced with suitably rotated one dimensional QAM (multiple signaling points). The same effect can be achieved by transmitting the different sub-carriers and I (0-degree) and Q (90-degree) with different energies. If any of these special techniques is used, we obtain more freedom in the design of our VHT_SIG, but, the receiver will also become more complex. A simple energy difference measurement that can measure rotated-BPSK will probably not suffice.

The implementation of this technology results in several advantages. First, different classes of users can be assigned different 0-1 sequences. Since a wrong 0-1 sequence will make the VHT-SIG look like normal data, the data meant for different classes can be easily separated. This is very useful in selective broadcast and multicast. Additionally, different contents can be assigned special sequences whereby low rate data subscribers can be protected from the demanding high data rate video traffic subscribers.

Also, older 11a/b/g devices have few RF chains and A/D converters. VHT has a larger number of RF chains and A/D converters to achieve the higher throughput. This will have a proportional higher power footprint. By assigning a special sequence to low-power VHT clients, those clients are allowed to switch to fewer RF chains and save power, without affecting performance. The mode can be negotiated between the AP and the client whereby low-power clients can avoid decoding packets that are known not to be intended for them. Consequently, these clients will no longer limit the throughput of the more capable clients. Finally, since the 0-1 sequence needs to be known to both the transmitter and receiver, any other random sequence will result in a 0-metric which is indistinguishable from normal data. This provides an extra layer of security.

A method and system for detecting packets of different formats in a receiver is disclosed. The method and system include initializing the receiver to be in a legacy mode, receiving at least one data symbol by the receiver and detecting if there is a very high throughput (VHT) signal field within a data packet wherein the VHT signal field provides a substantially higher data rate than a HT signal field.

Figure 5:
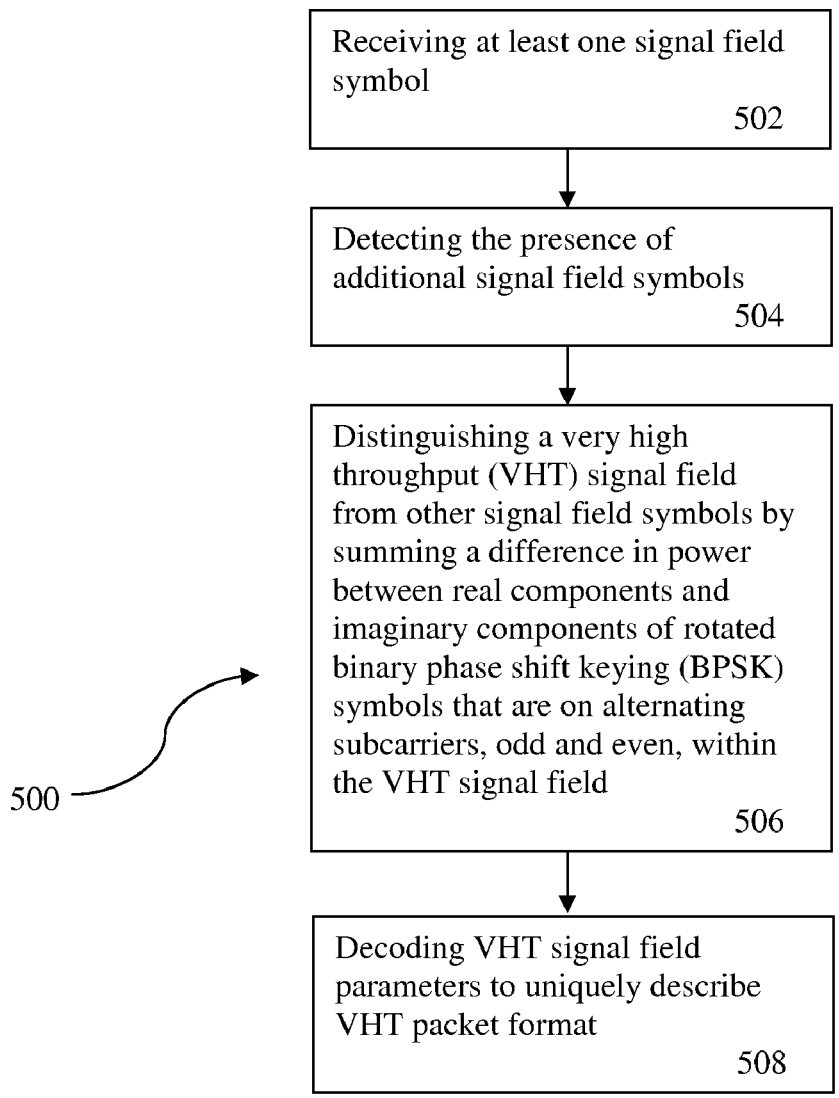
FIG. 5 illustrates a method for detecting packets of different formats in a receiver in accordance with an embodiment.

FIG. 5 illustrates a method 500 for detecting packets of different formats in a receiver. The method 500 comprises receiving at least one signal field symbol in step 502 and detecting the presence of additional signal field symbols in step 504. The method 500 further comprises distinguishing a very high throughput (VHT) signal field from other signal field symbols by summing a different in power between real components and imaginary components of rotated binary phase shift keying (BPSK) symbols that are on alternating subcarriers, odd and even, within the VHT signal field in step 506 and decoding VHT signal field parameters to uniquely describe VHT packet format in step 508.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for detecting packets of different formats in a receiver comprising:
   receiving at least one signal field symbol;
   detecting the presence of additional signal field symbols;
   distinguishing a very high throughput (VHT) signal field from other signal field symbols by summing a difference in power between real components and imaginary components of rotated binary phase shift keying (BPSK) symbols that are on alternating subcarriers, odd and even, within the VHT signal field, wherein the VHT signal field allows for a backward compatibility with other devices; and decoding VHT signal field parameters to uniquely describe VHT packet format.

2. The method of claim 1 wherein the rotated BPSK symbols are rotated 90 degrees.

3. The method of claim 2 wherein the rotated BPSK symbols are on the even alternating subcarriers.

4. The method of claim 2 wherein the rotated BPSK symbols are on the odd alternating subcarriers.

5. The method of claim 1 wherein the imaginary components are large relative to the real components if the VHT signal field comprises 90 degree rotated BPSK symbols.

6. The method of claim 1 wherein summing the difference comprises a summation wherein the summation comprises:

$$\sum_{i,even}^{Nsc}(I_i^2 - Q_i^2) - \sum_{k,odd}^{Nsc}(I_k^2 - Q_k^2).$$

7. A system for detecting packets of different formats in a receiver comprising:
   a processor; and
   a memory device coupled to the processor, said memory device storing an application which, when executed by the processor, causes the processor to:
   receive at least one signal field symbol;
   detect the presence of additional signal field symbols;
   distinguish a very high throughput (VHT) signal field from other signal field symbols by summing a difference in power between real components and imaginary components of rotated binary phase shift keying (BPSK) symbols that are on alternating subcarriers, odd and even, within the VHT signal field, wherein the VHT signal field allows for a backward compatibility with other devices; and
   decode VHT signal field parameters to uniquely describe VHT packet format.

8. The system of claim 7 wherein the rotated BPSK symbols are rotated 90 degrees.

9. The system of claim 8 wherein the rotated BPSK symbols are on the even alternating subcarriers.

10. The system of claim 8 wherein the rotated BPSK symbols are on the odd alternating subcarriers.

11. The system of claim 7 wherein the imaginary components are large relative to the real components if the VHT signal field comprises 90 degree rotated BPSK symbols.

12. The system of claim 7 wherein summing the difference comprises a summation wherein the summation comprises:

$$\sum_{i,even}^{Nsc}(I_i^2 - Q_i^2) - \sum_{k,odd}^{Nsc}(I_k^2 - Q_k^2).$$

* * * * *

UNITED STATES PATENT AND TRADEMARK OFFICE
CERTIFICATE OF CORRECTION

PATENT NO.        : 8,228,806 B2
APPLICATION NO.   : 12/563979
DATED             : July 24, 2012
INVENTOR(S)       : Thomas E. Pare, Jr. et al.

It is certified that error appears in the above-identified patent and that said Letters Patent is hereby corrected as shown below:

Title Page
    Item (73) Assignee
    Change "Mediatek Inc., Hsin-Chu (TW)" to read -- Mediatek Inc., Hsin-Chu (TW); IWT (Innovations
    In Wireless Technology Inc., Cupertino, CA --

Signed and Sealed this
Twenty-third Day of October, 2012

David J. Kappos
*Director of the United States Patent and Trademark Office*